United States Patent [19]

Sato et al.

[11] Patent Number: 4,563,731
[45] Date of Patent: Jan. 7, 1986

[54] RESONANT TYPE CONSTANT VOLTAGE SUPPLY APPARATUS

[75] Inventors: Toshiaki Sato, Hirakata; Mikio Maeda, Katano; Masahiro Kosaka, Suita, all of Japan

[73] Assignee: Matsushita Electric Industrial Co., Ltd., Osaka, Japan

[21] Appl. No.: 455,533

[22] Filed: Jan. 4, 1983

[30] Foreign Application Priority Data

| Jan. 7, 1982 | [JP] | Japan | 57-1456 |
| Jan. 18, 1982 | [JP] | Japan | 57-6312 |
| Jan. 21, 1982 | [JP] | Japan | 57-8364 |
| Jan. 22, 1982 | [JP] | Japan | 57-9291 |
| Jan. 25, 1982 | [JP] | Japan | 57-10752 |

[51] Int. Cl.⁴ ............................................. H02P 13/22
[52] U.S. Cl. ........................................ 363/17; 363/28
[58] Field of Search ..................... 363/16, 17, 28, 29, 363/96, 98, 136

[56] References Cited

U.S. PATENT DOCUMENTS 4,336,584  6/1982  Careglio .................. 363/28

FOREIGN PATENT DOCUMENTS 157267  12/1981  Japan ..................... 363/17

OTHER PUBLICATIONS

"An Improved Method of Resonant Current Pulse Modulation for Power Converters", IEEE Trans. on Industrial Electronics and Control Instrumentation, vol. IECI-23, No. 2, May 1976, pp. 133–141.

"A New High Frequency Resonant Technique for Dynamic Correction of Offline Converter Input Current Waveforms", Proceedings of Powercon 10, F-1, pp. 1-7.

*Primary Examiner*—William H. Beha, Jr.
*Attorney, Agent, or Firm*—Wenderoth, Lind & Ponack

[57] ABSTRACT

A resonant type constant voltage supply apparatus has a LC series resonance circuit. Energy stored in both a resonance capacitor and a resonance inductor is directly transferred to the output or input terminal of the apparatus. A control transformer is provided in parallel with the resonance capacitor for deriving the energy stored in the resonance capacitor. The amount of the energy stored in the resonance capacitor can be controlled by changing the switching frequency of the apparatus or the inductance of the control transformer, so as to thereby control the amount of energy transferred to the output or input terminal of the apparatus and thereby stabilize the output voltage of the apparatus.

2 Claims, 43 Drawing Figures

FIG. 26(a).
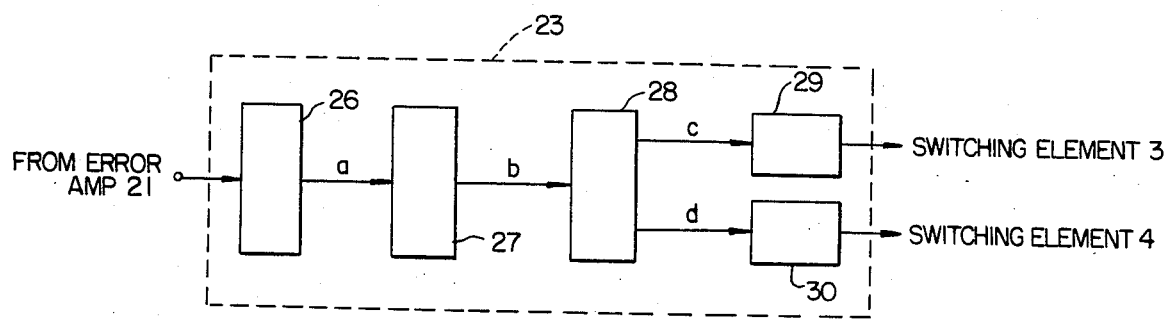
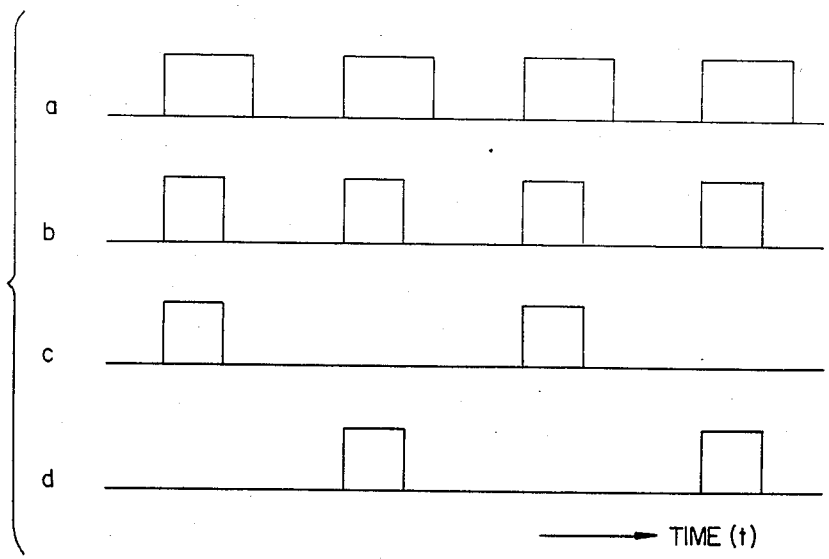
FIG. 26(b).

RESONANT TYPE CONSTANT VOLTAGE SUPPLY APPARATUS

FIELD OF THE INVENTION

This invention relates to a constant voltage supply apparatus employing a DC-DC converter for obtaining a stabilized DC output voltage, especially employing a series resonant type DC-DC converter.

BACKGROUND OF THE INVENTION

Conventionally, a switching regulator employing a pulse width control system which operates by the on-off operation of switching elements has been used mainly for the constant voltage supply apparatus. The switching regulator is useful for miniaturization and is lightweight due to its high efficiency, but the existence of its switching time causes defects in that its switching loss, useless radiation noise and conduction noise, are larger. Therefore, the regulator is restricted in its service range so that, when used especially as the power source for acoustic apparatus, noise suppression countermeasures, such as filters of large attenuation inserted into the input and output units are a completely air-tight shield provided, must be used, thereby creating a problem of high manufacturing cost or low reliability.

A means of solving the above problem has been proposed, which uses a series resonant type DC-DC converter comprising a converter-transformer and a resonance capacitor connected in series thereto as shown in FIG. 1 so that switching elements are alternately on and off to obtain the predetermined output energy through the transformer. In detail, in FIG. 1, reference numerals 1 and 2 designated direct-current power sources, 3 and 4 designate switching elements, such as transistors or thyristors, 7 designates a resonance capacitor, 5a designates the primary winding of converter-transformer 5, connected in series with the resonance capacitor 7, 5b designates the secondary winding of converter-transformer 5, whose output is connected to a smoothing capacitor 9 through a rectifying diode 8, and 10 designates a load. The switching elements 3 and 4 are alternately switched so that when the switching element 3 is on and that 4 is off, a current of a sine wave form flows in a loop of DC power source 1→switching element 3→the primary winding 5a at converter-transformer 5→resonance capacitor 7→DC power source 1. On the other hand, when the switching element 3 is off and that 4 is on, a current of a sine wave form flows in a loop of DC power source 2→resonance capacitor 7→the primary winding 5a→switching element 4→DC power source 2. A cycle period of the current is equal to $2\pi\sqrt{C_7 L_{5a}}$ decided by capacitance $C_7$ of resonance capacitor 7 and effective inductance $L_{5a}$ of converter-transformer 5, the operational wave form being shown in FIG. 2. In FIG. 2, (a) and (b) show timing charts of switching elements 3 and 4 and (c) shows a current wave form corresponding to the timing shown in (a) and (b). As clearly understood from FIG. 2, since the current is zero when the switching elements 3 and 4 are alternately switched, the switching losses remarkably decrease, thereby not only expecting high efficiency but also causing a decrease in useless radiation noise and conduction noise.

The series resonant type DC-DC converter in FIG. 1, however, is difficult to stabilize against a wide variation of input and load, whereby the problem of how to control the output voltage so as to be in a stable condition still remains unsolved.

Conventionally, a series resonant type DC-DC converter utilizing the series resonance circuit comprising a resonance capacitor and a resonance coil, has been proposed in order to solve the above problem. Such a series resonant type DC-DC converter operates the series resonance circuit to cause a current of a sine wave form to flow during the conduction of a switching element so that the current and voltage intercross at the zero point when the switching elements are on and off, thereby having a characteristic of remarkably reducing the switching loss and useless radiation. In the conventional series resonant type DC-DC converter, however, it has been difficult to stabilize the output DC voltage without hindering the above characteristic with respect to the input and load fluctuation.

SUMMARY OF THE INVENTION

An object of the present invention is to provide a constant voltage supply apparatus which can solve the above problem and is easily controllable in a wide voltage range, and is high in efficiency and low in noise.

This invention is characterized in that a DC-DC converter which constitutes a series connection circuit comprising switching elements operating on or off at least with respect to an input DC power source, the primary winding of a converter-transformer, and a resonance capacitor, the secondary winding of the converter-transformer being connected with a first rectifier circuit and a smoothing circuit to thereby obtain DC output voltage at the output terminals, so that a transfer circuit capable of transferring the energy of the resonance capacitor outwardly therefrom is connected to the DC-DC converter. Also, the principle such that an initial voltage value of resonance capacitor is controlled to control a resonance current to result in control of a load current, is applied to the invention.

Furthermore, in this invention, the transfer circuit comprises a converter-transformer or a control transformer having a variable primary inductance connected to the resonance capacitor, thereby transferring the energy toward the output or input side.

Also, a control means, when used with a converter-transformer, adopts the cycle period of turning the switching elements on or off and, and when used with a control transformer, adopts a means of changing the inductance and the cycle period of turning the switching period on or off.

The constant voltage supply apparatus of the invention constructed as the above is simple in construction and can stabilize the output DC voltage while putting the above characteristic to practical use.

The above and other objects of the invention will become more apparent in the following description with the accompanying drawings in which:

BRIEF DESCRIPTION OF THE DRAWINGS

FIG. 26-(a) is a block diagram of an embodiment of a distributing circuit, and FIG. 26-(b) shows waveforms at various points of the distributing circuit.

DESCRIPTION OF THE PREFERRED EMBODIMENTS

Figure 1:
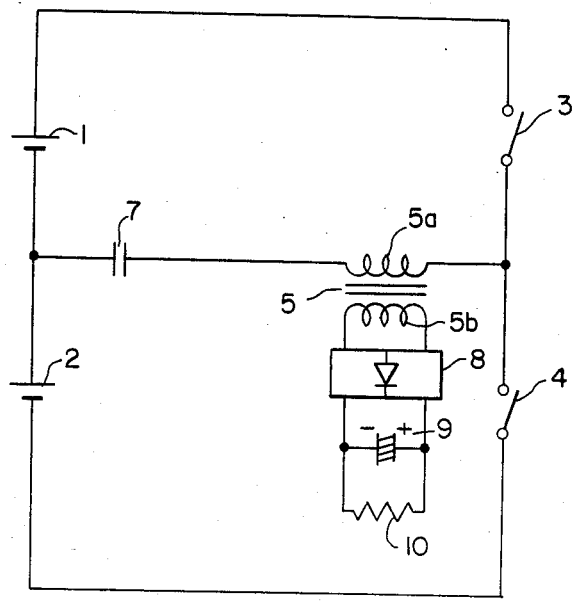
FIG. 1 is a circuit diagram of a conventional series resonant type DC-DC converter.
Figure 2:
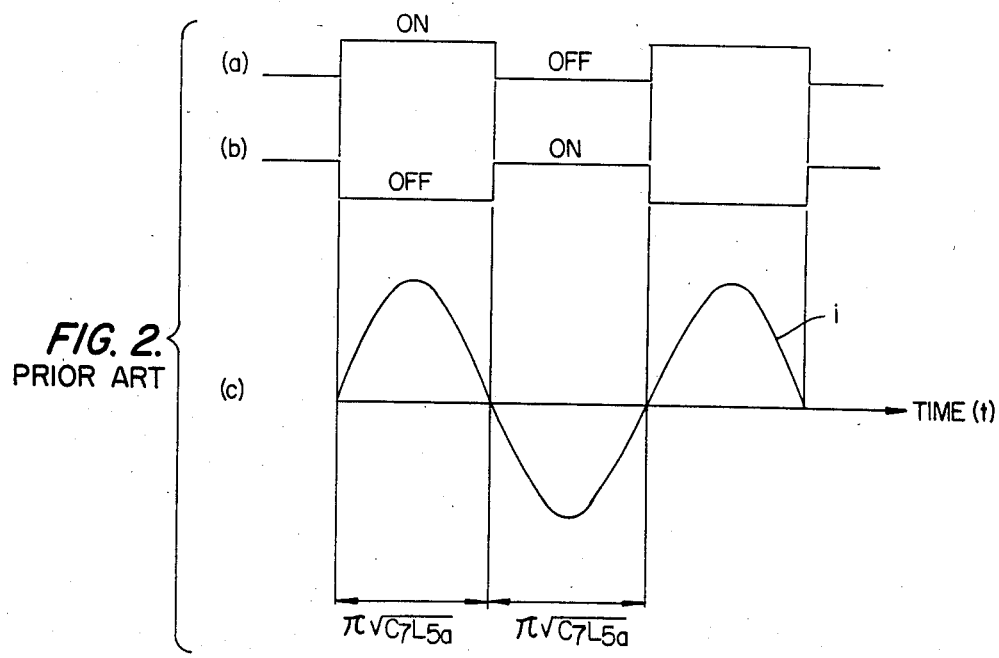
FIGS. 2-(a), 2-(b) and 2-(c) show waveforms explanatory the operation of the FIG. 1 DC-DC converter.
Figure 3:
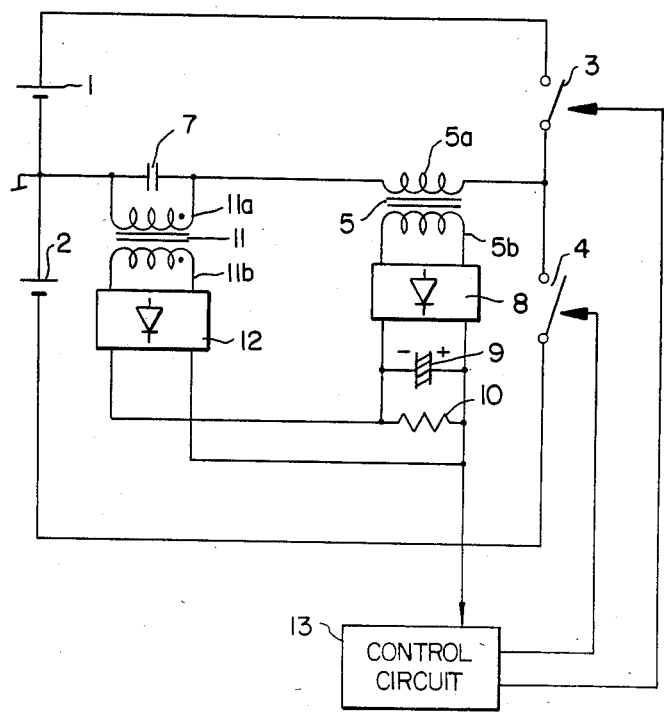
FIG. 3 is a circuit diagram of a first embodiment of a constant voltage supply apparatus of the invention.

The circuit diagram of the first embodiment of the invention is shown in FIG. 3, in which the same components as in FIG. 1 are designated by the same reference numerals. The construction in FIG. 3 is different from that in FIG. 1 in that the primary winding $11a$ of a control converter-transformer 11 is connected in parallel to a resonance capacitor 7, the secondary winding $11b$ of the same being connected to a load 10 through a rectifier circuit 12. In addition, reference numeral 13 designates a control circuit which turns switching elements alternately on and off.

Next, the control principle of the series resonance type DC-DC converter of the invention, prior to explanation of operation of the embodiment, will be detailed in accordance with FIG. 1.

In FIG. 1, when the switching element 3 (or 4) is on and element 4 (or 3) is off, a current $i_1(t)$ of sine wave form flowing in the primary winding $5a$ of converter-transformer 5 is given by the following equation:

$$i_1(t) \approx \frac{E_c - V_o + V_c}{\sqrt{\frac{L_{5a}}{C_7}}} \times \epsilon^{-\alpha t} \times \sin \omega_o t,$$

where $$0 \leq t \leq \pi \sqrt{C_7 L_{5a}}, \quad \alpha = \frac{R_s}{2L_{5a}}, \quad \omega_o = \frac{1}{\sqrt{C_7 L_{5a}}},$$

$R_c$: voltage of DC power source 1 or 2,
$V_o$: output voltage changed into the primary side,
$V_c$: the initial voltage value of resonance capacitor 7, and
$R_s$: equivalent series loss resistance in FIG. 1.

A current of the mean value of a resonance current given in the above equation is transmitted to the secondary through the converter-transformer 5 in a suitable turns ratio between the primary and the secondary, which current is a load current. The inequality $(E_c - V_o) << V_c$ controls the initial voltage value $V_c$ of resonance capacitor 7 to thereby control the resonance current $i_1(t)$, resulting in control of load current.

The present invention applies the above principle so that the initial voltage value of resonance capacitor 7 is controlled by a control converter-transformer 11 connected in parallel to the resonance capacitor 7, thereby expecting stabilization of the output DC voltage.

Figure 4:
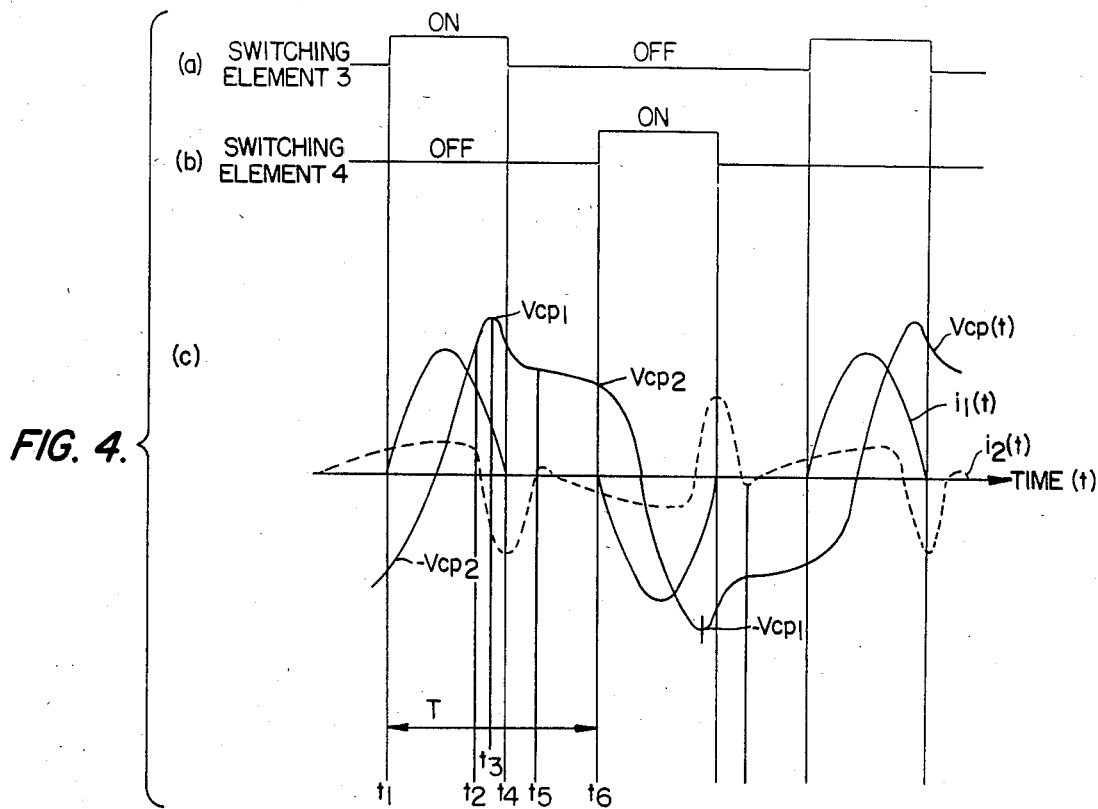
FIGS. 4-(a), 4-(b) and 4-(c) show waveforms explanatory of the operation of the FIG. 3 embodiment.

Now, explanation will be given on operation of the FIG. 3 embodiment of the invention with reference to the FIGS. 4(a)-4-(c) waveforms showing the operation of the circuit shown in FIG. 3. FIGS. 4-(a) and -(b) are timing charts of switching elements 3 and 4 respectively and FIG. 4-(c) shows a current $i_1(t)$ flowing in the primary winding $5a$, a current $i_2(t)$ flowing in the primary winding $11a$ of control converter-transformer 11, and voltage $V_{cp}$ across the resonance capacitor 7.

In FIG. 3, an initial voltage value of resonance capacitor 7 at the time $t_1$ is represented by $-V_{cp2}$. When the switching element 3 is on and element 4 is off for a time period from $t_1$ to $t_4$, the resonance current $i_1(t)$ flows in a loop of the plus side of DC power source 1→switching element 3→the primary winding $5a$ of converter-transformer 5→resonance capacitor 7→DC power source 1, and a current $i_2(t)$ flows in the primary winding $11a$ of control converter-transformer 11 during the time period when $t_1 \leq t \leq t_2$, serves as an exciting current for the control converter-transformer 11. Voltage $V_{cp}(t)$ of resonance capacitor is raised by the resonance current $i_1(t)$ and exciting current $i_2(t)$, and the voltage at the secondary winding $11b$ of control converter-transformer 11 subsequently rises, and, when exceeding the output voltage plus the forward drop voltage of rectifier circuit 12, the rectifier circuit 12 is turned on so as to cause a flow of current at the output terminals. Such a current flows so as to invert the direction of current flowing in the primary winding $11a$ of the control converter-transformer; in other words, the resonancce capacitor 7 starts its discharge. The cycle period of discharge current $i_2(t)$ is decided by capacitance $C_7$ of the resonance capacitor 7 and leakage inductance $L_l$ of control converter-transformer 11, which becomes a value of about $\pi \sqrt{C_5 L_l}$.

Next, during the time period when $t_2 \leq t \leq t_3$, the resonance current $i_1(t)$ flows into the resonance capacitor 7 and simultaneously the discharge current $i_2(t)$ flows into the capacitor 7 through the control converter-transformer 11. During this time period, the inequality $|i_1(t)| > |i_2(t)|$ allows the voltage of resonance capacitor 7 to rise so that when $|i_1(t)| = |i_2(t)|$, or in other words, at the time $t_2$, the voltage becomes the maximum value $V_{cp1}$.

Next, during the time period when $t_3 \leq t \leq t_5$, then |resonance current $i_1(t)$| < |discharge current $i_2(t)$|, whereby the voltage of resonance capacitor 7 starts lowering more than voltage $V_{cp1}$. Furthermore, during the time period when $t_5 \leq t \leq t_6$, the exciting current component $i_2(t)$ of control converter-transformer 11 further lowers the voltage of resonance capacitor 7 and becomes $V_{cp2}$ at the time $t_6$.

The switching element 4 is turned on to start a flow of the resonance current $i_1(t)$ as shown in the aforesaid equation, in which the voltage $V_{cp2}$ is used as the initial charge voltage value for the resonance capacitor 7.

In a case of repeating the aforesaid operations, the cycle period T of the respective switching elements 3 and 4 is changed so that the initial charge voltage value $V_{cp2}$ of resonance capacitor 7 is chargeable as seen from the above operation. In other words, the cycle period T of the respective switching elements 3 and 4 is changed to enable variations of the resonance current $i_1(t)$ as shown in the aforesaid equation.

Hence, the output is controllable by a larger cycle period T when the output rises, and by a smaller cycle period T when the output lowers.

Alternatively, the switching frequency, instead of the cycle period T, may be changed to obtain the same effect.

Figure 5:
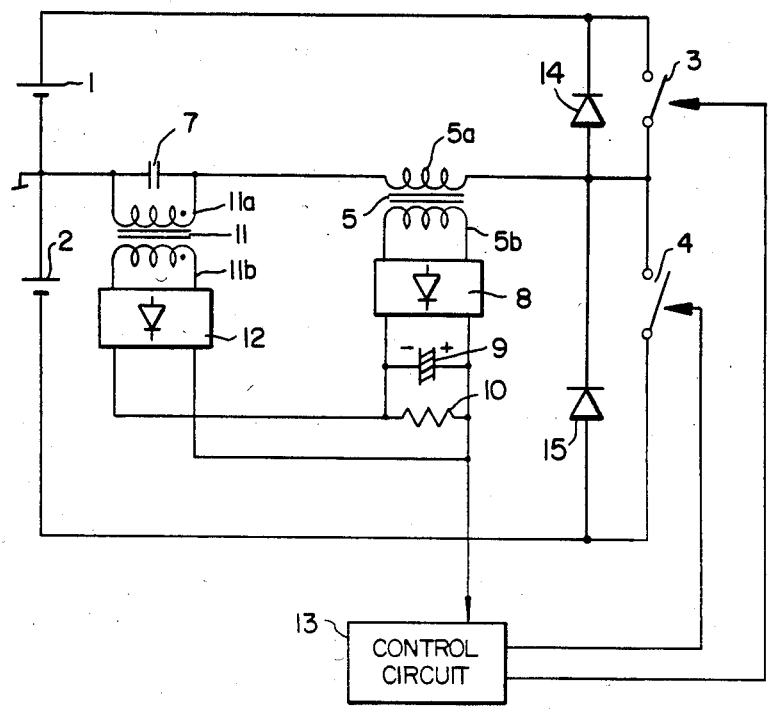
FIG. 5 is a circuit diagram of a second embodiment of the invention.

Next, a second embodiment of the invention will be shown in FIG. 5, in which the same components as in FIG. 3 are designated by the same reference numerals. In FIG. 5, diodes 14 and 15, which can enable a current to flow in a direction reverse to the current flowing in the switching elements 3 and 4, are added and connected in parallel to the switching elements 3 and 4. The FIG. 5 circuit, during the time period when $t_2 \leq t \leq t_5$ as in FIG. 4, or in other words, during the flow of the current $i_2(t)$ to the output terminals through the control converter-transformer 11, a feedback current $i_3(t)$ flows to the DC power source 1 (or 2) through the diode 14 (or 15), whereby the voltage $V_{cp}(t)$ of resonance capacitor 7 is intended to change by a large amount. In other words, in the FIG. 3 circuit, the main factor to change the voltage of resonance capacitor 7 is only the current $i_2(t)$ flowing in the primary winding 11a of control converter-transformer 11, whereby the circuit in FIG. 5 is so constructed that the feedback current $i_3(t)$ is added to the current $i_2(t)$. Hence, the FIG. 5 embodiment is more advantageous than the FIG. 3 embodiment in that a variation in the width of the cycle period T (or switching frequency) necessary to control the circuit may be reduced.

Figure 6:
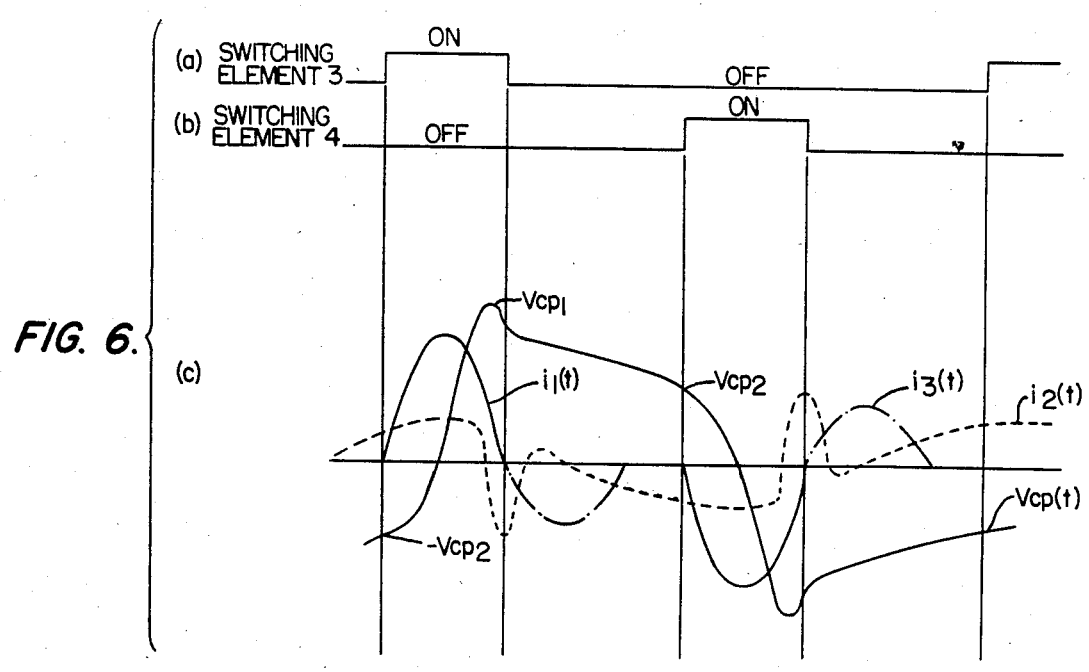
FIGS. 6-(a), 6-(b) and 6-(c) show waveforms explanatory of the operation of the FIG. 5 embodiment.

The operation waveforms of the circuit shown in FIG. 5 are shown in FIGS. 6-(a), 6-(b) and 6-(c).

Figure 7:
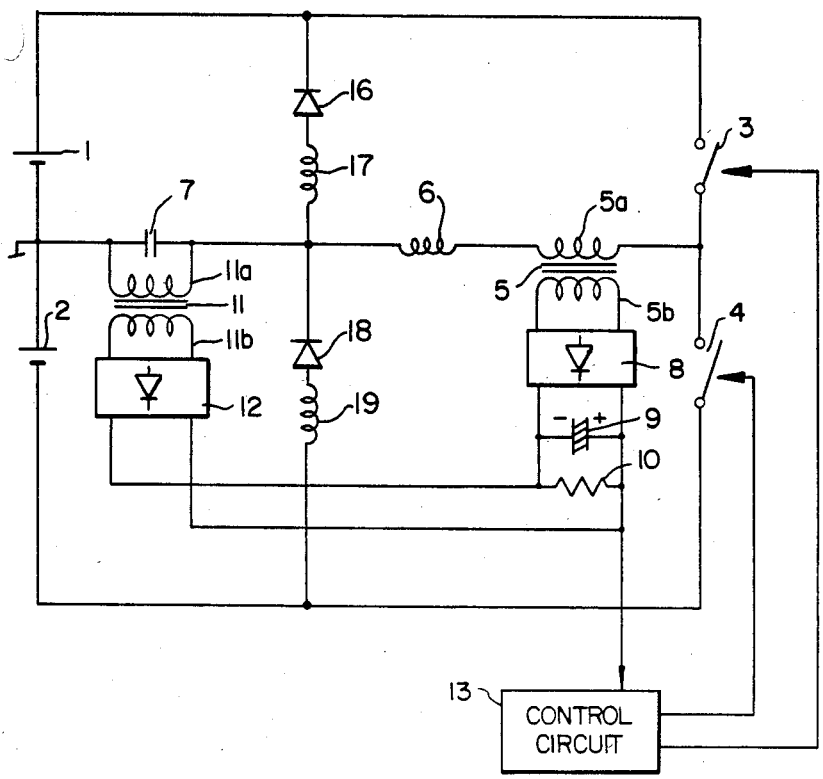
FIG. 7 is a circuit diagram of a third embodiment of the invention.

The third embodiment of the invention is shown in FIG. 7, in which the same components as in FIG. 3 also are designated by the same reference numerals. In the second embodiment in FIG. 5, the feedback current $i_3(t)$ returns to the DC power source 1 (or 2) through the primary winding 5a at the converter-transformer 5, but the third embodiment in FIG. 7 is adapted to enable the feedback current $i_3(t)$ to flow from the resonance capacitor 7 directly to the DC power source 1 (or 2) and not through the primary winding 5a. For this purpose, in FIG. 7, another diode 16 and a series connected coil 17 are interconnected between the DC power source 1 and the resonance capacitor 7 so that the plus side of the DC source 1 is connected to the cathode of diode 16. Also, a diode 18 and a series connected coil 19 are interconnected between the DC power source 2 and the resonance capacitor 7 so that the minus side of the DC source 2 is connected to the anode of diode 18.

Such construction can return the feedback current $i_3(t)$ from the resonance capacitor 7 directly to the DC power source 1 (or 2) Also, in the second embodiment, the cycle period of feedback current $i_3(t)$ is the same as that of resonance current $i_1(t)$, but the third embodiment also is advantageous in that the inductance value of resonance coil 17 (or 19) is changed to enable the cycle period of feedback current $i_3(t)$ to change as needed.

Figure 8:
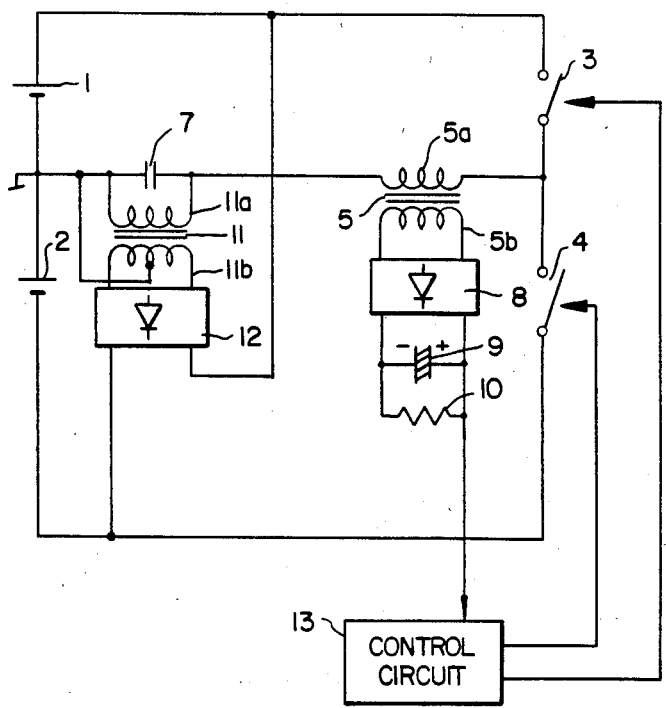
FIG. 8 is a circuit diagram of a fourth embodiment of the invention.

The circuit diagram of the fourth embodiment of the invention is shown in the FIG. 8, in which the same components as in the FIG. 3 embodiment are designated by the same reference numerals. The fourth embodiment in FIG. 8 is different from the first embodiment in FIG. 3 in that the secondary winding 11b of control converter-transformer 11 connected in parallel to the resonance capacitor 7 is connected to a rectifier circuit 12, whose outputs are connected to the plus side of the DC power source 1 and to the minus side of the DC power source 2 respectively. Furthermore, intermediate tap of the secondary winding 11b of control converter-transformer 11 is connected to the node of DC power sources 1 and 2.

Here, the third embodiment is fundamentally the same in the operation as the first embodiment and the wave forms of each element coincides with that in the first embodiment in FIG. 4.

The fourth embodiment is different in operation from the first embodiment such that when the voltage of secondary winding 11b exceeds the sum of voltage of the DC power source 1 or 2 and the forward drop voltage of rectifier circuit 12, the rectifier circuit is turned on to its current to flow towards the DC power source 1 or 2, but is otherwise quite the same in operation.

During the above operation, the cycle period T of the respective switching elements 3 and 4 is changed to make it possible to change the initial charge voltage value $-V_{cp2}$ of resonance capacitor 7 as seen from the operation in the FIG. 3 embodiment. In other words, the cycle period T is changed to enable a change of resonance current $i_1(t)$ given in the aforesaid equation to thereby control the output.

As seen from the above, the output is controllable by elongating the cycle period T when the output rises and by shortening the period when it lowers.

Alternatively, the switching frequency, instead of the cycle period T, may be changed to obtain the same effect.

Figure 9:
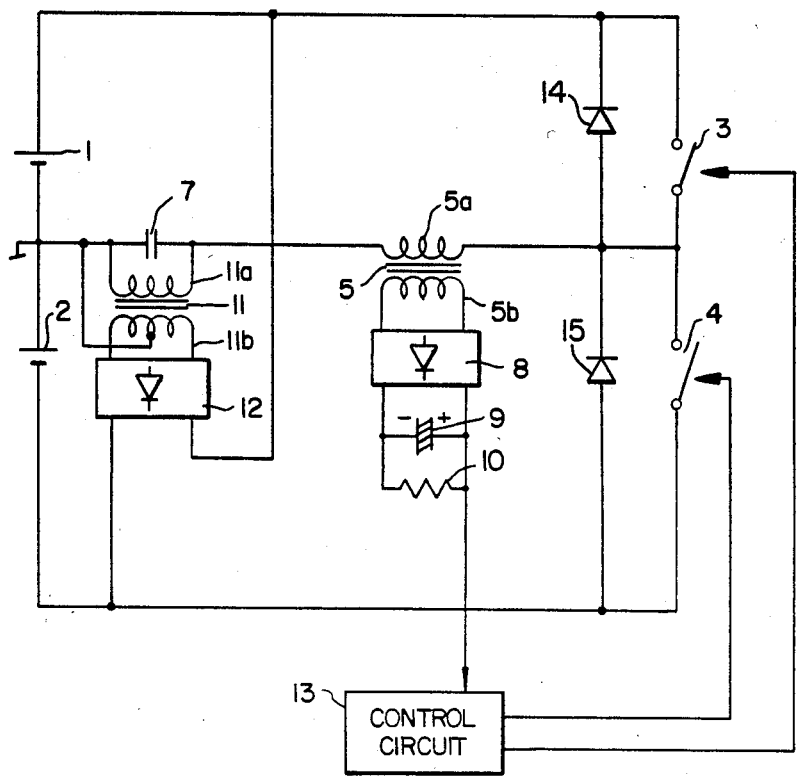
FIG. 9 is a circuit diagram of a fifth embodiment of the invention.

The fifth embodiment of the invention is shown in FIG. 9, in which the same components as in FIG. 8 are designated by the same reference numerals. The fifth embodiment adds to the fourth embodiment in FIG. 8 diodes 14 and 15 connected in parallel to the switching elements 3 and 4, these elements enabling a current to flow in the reverse direction to that of the current flowing in the elements 3 and 4. The FIG. 9 circuit diagram is intended to cause the feedback current $i_3(t)$ to flow to the DC power source 1 or 2 through the diode 14 or 15 for the time period when $t_2 \leq t \leq t_5$ as in FIG. 4, or in other words, during the flow of the output current $i_2(t)$ through the control converter-transformer 11, thereby greatly changing the voltage $V_{cp}$ at the resonance capacitor $V_{cp}$. In other words, the factor to change the voltage of resonance capacitor 7 is only the current $i_2(t)$ flowing in the primary winding 11a of control converter-transformer 11 in FIG. 8 embodiment, but the current $i_2(t)$ is added with the feedback current $i_3(t)$ in the fifth embodiment, resulting in the fifth embodiment being more advantageous than the fourth embodiment in that the cycle period T or switching frequency necessary for control may be smaller in its width variation.

Figure 10:
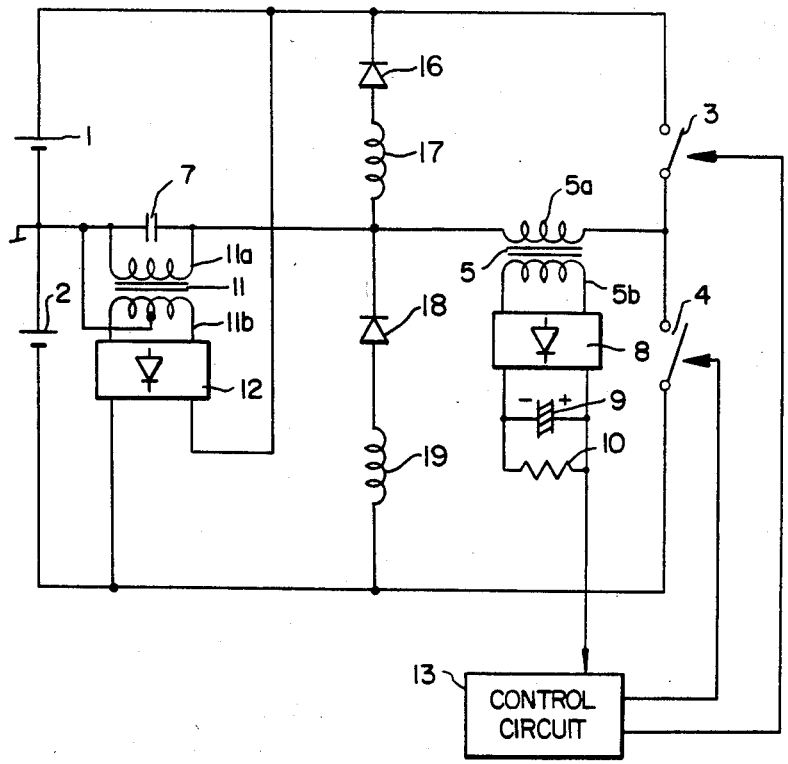
FIG. 10 is a circuit diagram of a sixth embodiment of the invention.

Next, the sixth embodiment of the invention is shown in FIG. 10, in which the same components the same as in FIGS. 1, 7 and 8 also are designated by the same reference numerals. In FIG. 10, the feedback current $i_3(t)$ is intended to flow from the resonance capacitor 7 directly to the DC power source 1 or 2 and not through the primary winding 5a of converter-transformer 5. The operation of the sixth embodiment is analagous to that of the third embodiment and has therefore been omitted herein for the sake of brevity. Incidentally, the cycle period of feedback current $i_3(t)$ is identical with that of resonance current $i_1(t)$, which is changed at will by changing the inductance value of coil 17 or 19 in FIG. 10.

Figure 11:
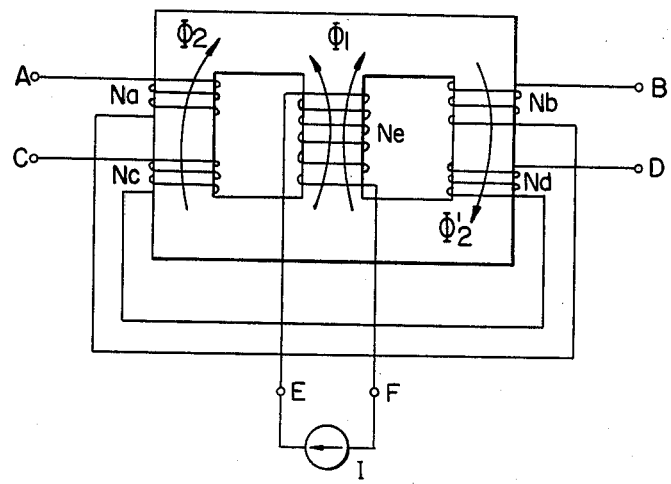
FIG. 11 is a schematic structural view exemplary of a control transformer used in this invention.
Figure 12:
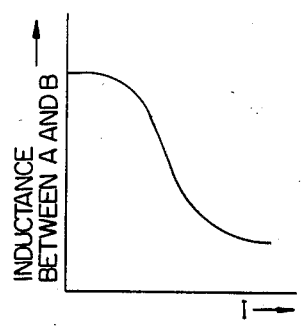
FIG. 12 shows the characteristic of the control transformer.
Figure 13:
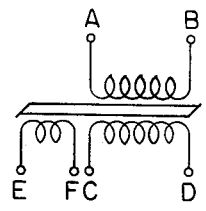
FIG. 13 shows the equivalent references thereof.

Next, explanation will be given on the seventh embodiment of the invention. Firstly, a control transformer used in this invention has a variable inductance. FIG. 11 is a schematic structural view exemplary of the control transformer and FIG. 12 shows the characteristic thereof and FIG. 13 shows references in an equivalent manner. Referring to FIG. 11, AC windings $N_a$, $N_b$, $N_c$ and $N_d$ are provided at both end legs of an assembled E-type core and I-type core, or two assembled E-type cores, respectively, the central leg providing a DC winding $N_e$, and a DC power source I interconnected between the control terminals E and F at the DC winding $N_e$. Reference letters A and B designate input terminals and C and D designate output terminals respectively. The AC winding $N_a$ and $N_b$ are connected in series to thereby constitute a first winding wound so as to cancel the magnetic flux induced in the central leg by an AC current from the input terminals A and B, the magnetic flux $\phi_2$ and $\phi'_2$ induced from the AC windings $N_a$ and $N_b$ being equal. Furthermore, the AC windings $N_c$ and $N_d$ are connected in series to the output terminal C and D so as to constitute a second winding and are formed with a predetermined turns ratio with respect to AC windings $N_a$ and $N_b$.

Here, a direct current flows from the direct-current source to generate the magnetic flux $\phi_1$ in the DC winding $N_e$ so that the inductance changes between the input terminals A and B, which is shown in FIG. 12. Accordingly, it becomes possible to control the inductance between the input terminals A and B in the decreasing direction by means of the direct current fed to the control terminals E and F.

Figure 14:
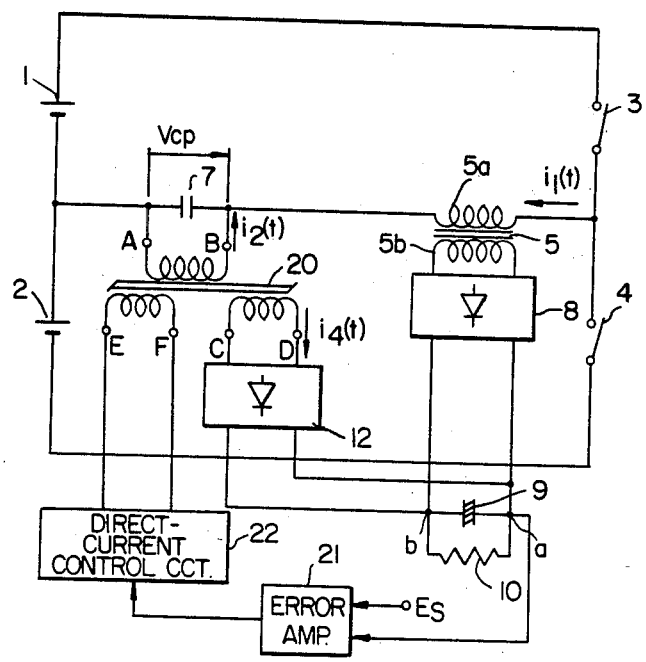
FIG. 14 is a circuit diagram of a seventh embodiment of the invention.
Figure 15:
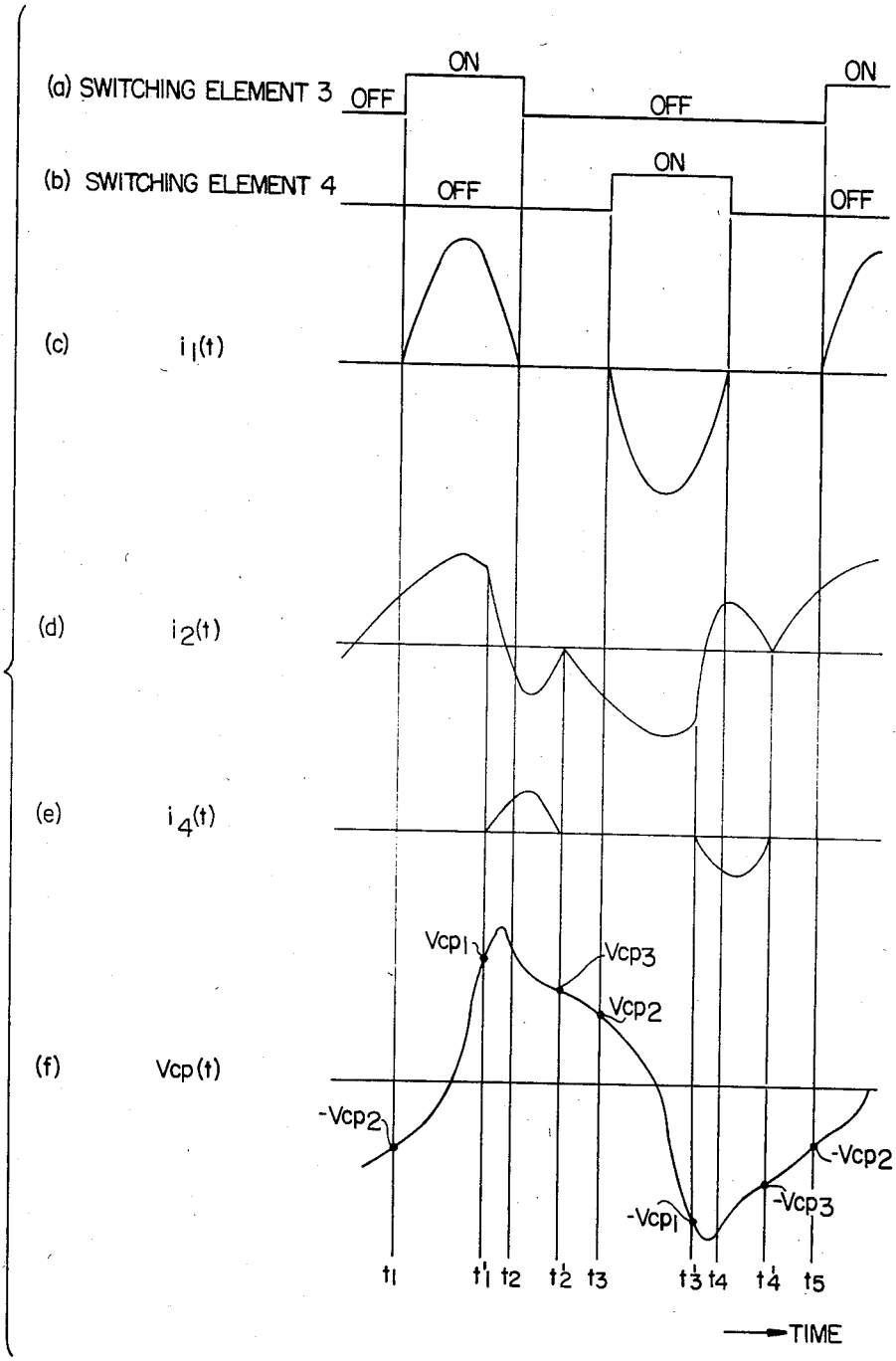
FIGS. 15-(a), 15-(b), 15-(c), 15-(d), 15-(e) and 15-(f) show waveforms explanatory of the operation of the FIG. 14 embodiment.

FIG. 14 is a circuit diagram of the seventh embodiment, in which the same components as in FIG. 3 are designated by the same reference numerals and FIGS. 15-(a), 15-(b), 15-(c), 15-(d), 15-(e) and 15-(f) show waveforms of operation of the FIG. 14 embodiment.

In FIG. 14, reference numeral 20 designates a control transformer exemplified in FIG. 11; element 12 designates a rectifier circuit; element 21 designates an error amplifier, and element 22 designates a direct-current control circuit. The input terminals A and B of control transformer 20 are connected to both ends of resonance capacitor 7, the output terminals C and D of the transformer 20 are connected to the rectifier circuit 12, and the control terminals E and F of the transformer 20 are connected to the output terminals of direct-current control circuit 22, the output side of rectifier circuit 12 being connected to the output terminals a and b of DC-DC converter-transformer. The input terminals of the error amplifier 21 are fed a DC output voltage obtained at the output terminals a and b of DC-DC converter-transformer 5 and a predetermined reference voltage $E_s$ respectively; the respective voltage values are compared to supply a difference signal thereof to the direct-current control circuit 22. The direct-current control circuit 22 feeds a direct-current to the control terminals E and F at the control transformer 20 of a value corresponding to the output signal from the error amplifier 21, thereby changing the inductance value between the input terminals A and B (across the primary winding) of control transformer 20, and constitutes a control means.

Next, explanation will be given on the operation of the seventh embodiment in accordance with the waveforms shown in FIGS. 15-(a)–15-(f). In addition, the explanation on operation of the components duplicate of those in the conventional example in FIG. 1 are omitted herein. The cycle period of resonance current $i_1(t)$ flowing in the resonance circuit is decided by the effective leakage inductance of converter-transformer 5, and the capacitance of resonance capacitor 7, and the inductance between the input terminals A and B of control transformer 20, and a control current $i_2(t)$ flowing between the input terminals A and B of control transformer 20 becomes a continuous sine wave form and synchronizes with the resonance current $i_1(t)$. Voltage $V_{cp}(t)$ of resonance capacitor 7 increases in proportion to the sum of resonance current $i_1(t)$ and control current $i_2(t)$. The above condition is carried out for the time period from the time $t_1$ when the switching element 3 is on, to the time $t_1'$. At the time $t_1'$, when voltage induced between the output terminals C and D (across the secondary winding) of control transformer 20 exceeds the DC output voltage obtained between the output terminals a and b of DC-DC converter, an output current $i_4(t)$ from the resonance capacitor 7 flows to the output terminals a and b of DC-DC converter through the control transformer 20. Such an operational condition is for the time period from the time $t_1'$ to $t_2'$. Also, the output current $i_4(t)$ of control transformer 20 flowing for the above time period becomes a sine wave form so that the cycle period thereof is decided by the capacitance of resonance capacitor 7 and the effective leakage inductance of control transofrmer 20. The above phenomenon allows the voltage $V_{cp}$ to lower to $V_{cp3}$ (at the time $t_2'$) due to the flow of output current $i_4(t)$ of control transformer 20, and further lower until the time $t_3$ when the switching element is subsequently, turned on so that the voltage $V_{cp}$ becomes $V_{cp2}$. Thereafter, the alternately positive and negative waveform is repeated for the time period from the time $t_3$ to $t_5$, and after the switching element 3 is turned on at the time $t_5$, the wave-form of $V_{cp}(t)$ becomes the same as that at $t_1$. Since the value of resonance current $i_1(t)$ is decided by the initial voltage at the resonance capacitor 7, the value of the initial voltage is changed so as to change the value of the current transmitted to the secondary through the converter-transformer 5, thereby enabling the control of the energy supplied to the output terminals a and b at the DC-DC converter, the initial voltage being represented by $-V_{cp2}$ at the time $t_1$ and $V_{cp2}$ at the time $t_3$ in FIG. 15. The initial voltages $-V_{cp2}$ and $V_{cp2}$ relate to the output current $i_4(t)$ of control transformer 20 and also to the value of output current $i_4(t)$ relates to the control current $i_2(t)$. Hence, in order to change the DC output voltage obtained at the output terminals, the controllable construction need only provide for changing the value the control current $i_2(t)$. In brief, the present invention utilizes the fact that the value of the control current $i_2(t)$ is inversely proportional to the inductance between the input terminals A and B at the control transformer 20.

Figure 16:
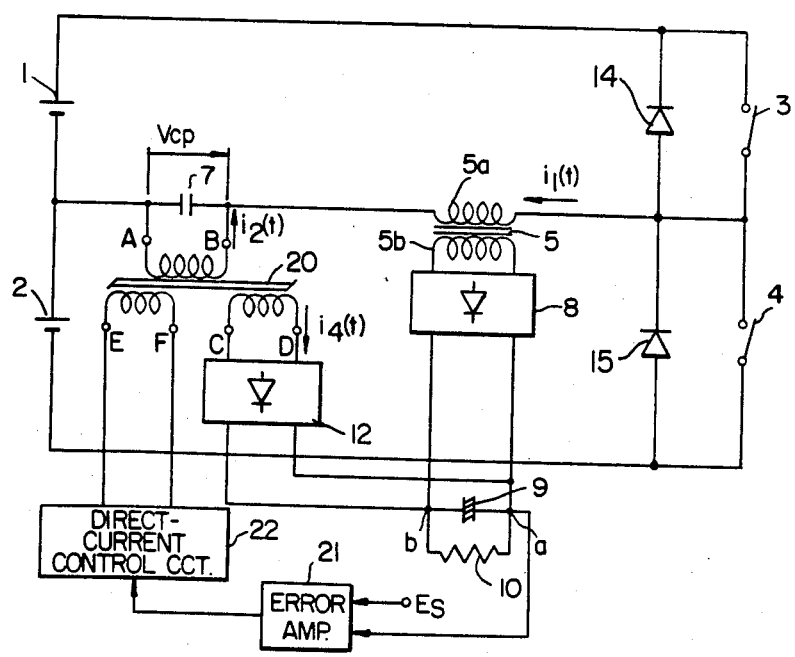
FIG. 16 is a circuit diagram of a eighth embodiment of the invention.
Figure 17:
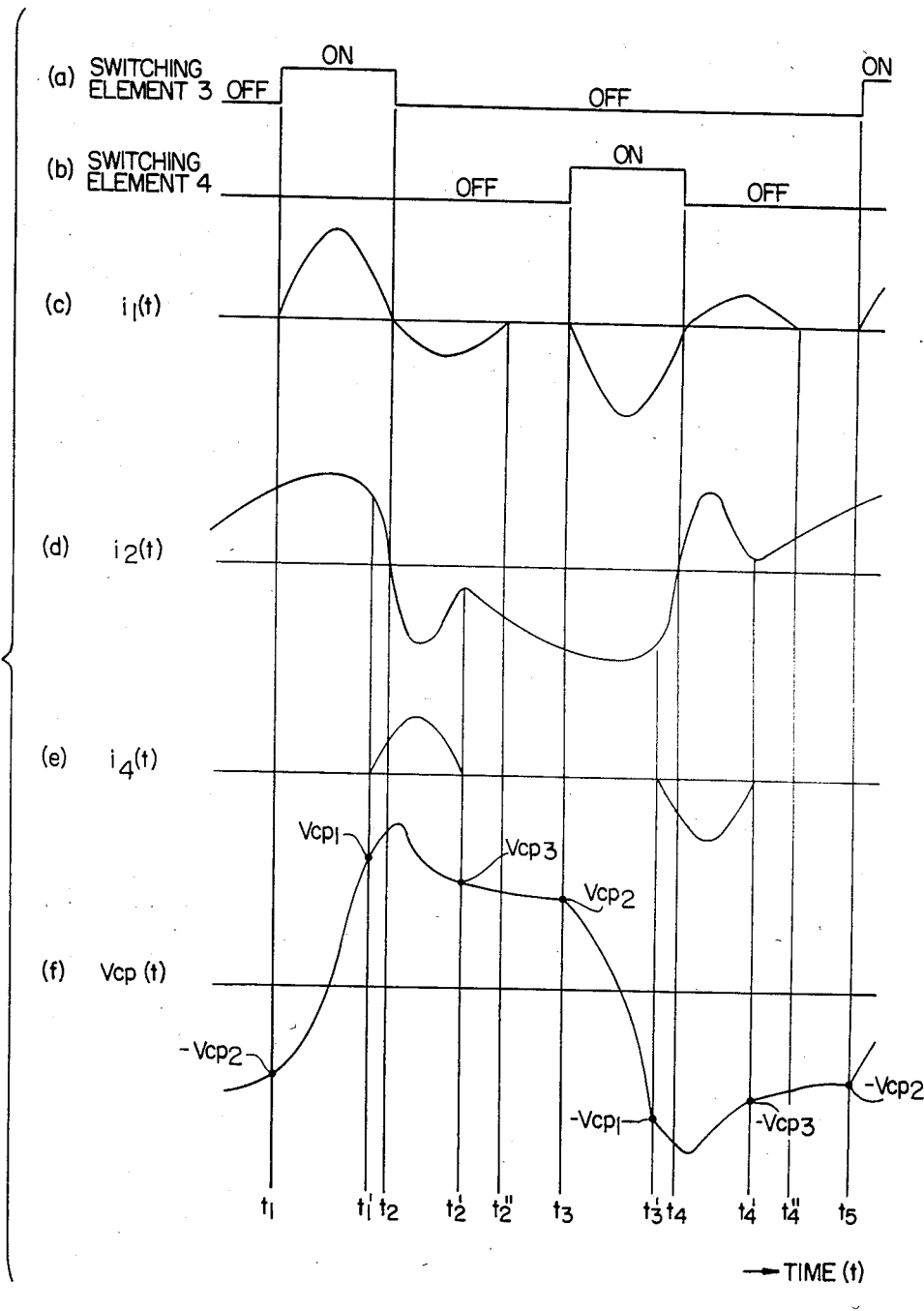
FIGS. 17-(a), 17-(b), 17-(c), 17-(d), 17-(e) and 17-(f) show waveforms explanatory of the operation of the FIG. 16 embodiment.

FIG. 16 is a circuit diagram of the eighth embodiment of the invention and FIG. 17 shows waveforms of components of the eighth embodiment. In addition, in FIG. 16, the components having the same functions as those in FIG. 14 are designated by the same reference numerals. The circuit in the eighth embodiment is different from that in FIG. 14 in that diodes 14 and 15 are connected in parallel to the switching elements 3 and 4 so as to conductive in the reverse direction with respect to the conduction thereof, or in other words, being reverse-biased with respect to the DC power sources 1 and 2. The eighth embodiment is similar in operational principle basically to that of the seventh embodiment in FIG. 14, but is intended to greatly change voltage $V_{cp}(t)$ of the resonance capacitor 7 by enabling the feedback current to flow from the resonance capacitor 7 to the DC power source 1 or 2 through the diode 14 or 15. Explanation will be given on the operation of the eighth embodiment with reference to FIG. 17, in which the operation of causing the output current $i_4(t)$ to flow from the control transformer is as described in the seventh embodiment in FIG. 14 so as to thereby be omitted herein for the sake of brevity. Now, the feedback current, at the time $t_2$ when the switching element 3 is off, flows from the resonance capacitor 7 to the DC power source 1 through the converter-transformer 5 and diode 14. Such phenomenon is created for the time period from the time $t_2$ to $t_2''$ as shown in the FIG. 17-(c) waveform of the resonance current $i_1(t)$. Therefore, the output current $i_4(t)$ of control transformer 20 and the feedback current largely change voltage $V_{cp2}$ of resonance capacitor 7 at the time $t_3$ when the switching element 4 is on, and thereafter, the same phenomenon is repeated. The control operation by the control means is quite the same as that in the seventh embodiment in FIG. 14.

Figure 18:
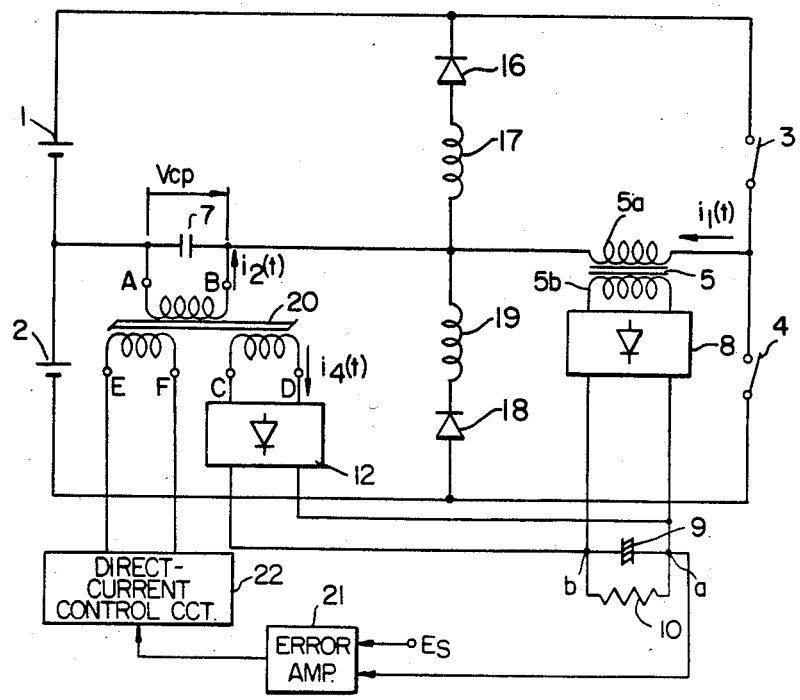
FIG. 18 is a circuit diagram of a ninth embodiment of the invention.

Next, the ninth embodiment of the invention will be shown in FIG. 18, in which the components functioning as the same as in the FIG. 14 are designated by the same reference numerals, the ninth embodiment enlarging a control range with respect to the input and output fluctuation. In FIG. 18, reference numerals 16 and 18 designate diodes and 17 and 19 designate series connected coils. In this case, the diodes 16 and 18 and coils 17 and 20 are connected in parallel to series circuits of switch elements 3 and 4 and the primary winding 5a of converter-transformer 5 respectively; the diodes 16 and 18 are connected in the reverse direction with respect to the conduction of switching elements 3 and 4, or in other words, they are connected in reverse bias with respect to the DC power sources 1 and 2. The ninth embodiment utilizes the feedback current from the resonance capacitor 7 in the same fashion as that described for the eighth embodiment, but differs therefrom in that the feedback current is fed back to the DC power source 1 or 2 through the diode 16 or 18 and coil 17 or 19 connected in series thereto but not through the converter-transformer 5, thereby not serving as the output energy for the DC-DC converter. Furthermore, the ninth embodiment can change the inductance of the coil 17 or 19, thereby making it possible to desirably change the cycle period of the feedback current. The control operation by the control means is quite the same as in FIG. 7 embodiment.

Figure 19:
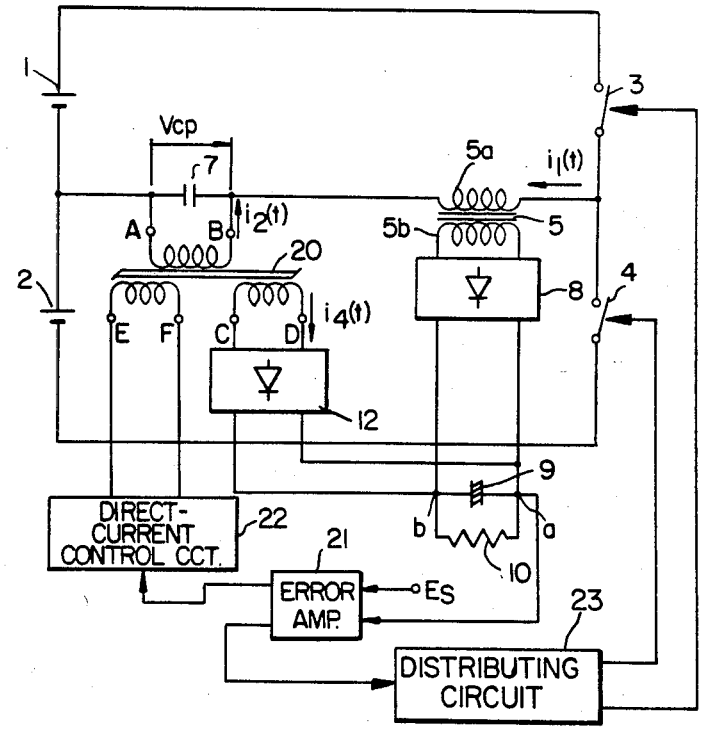
FIG. 19 is a circuit diagram of a tenth embodiment of the invention.

FIG. 19 is a circuit diagram of the tenth embodiment of the invention, in which the components having the same functions as those in the seventh embodiment in FIG. 14 are designated by the same reference numerals.

Here, a difference between the ninth embodiment in FIG. 14 and the tenth embodiment is to provide first and second control means. The first control means comprises the error amplifier 21 and direct-current control circuit 22, the second control means comprises the error amplifier 21 and a distribution circuit 23 for generating a pulse train which is frequency-modulated corresponding to the intensity of an output signal from the error amplifier 21 so as to give the pulse train to the switching elements 3 and 4 to be alternately on and off.

The tenth embodiment shown in FIG. 19 operates in a fashion similar to that of the seventh embodiment shown in FIG. 16, so that an explanation will be given only of the difference between the embodiments.

In FIG. 19, the input terminals A and B across the first winding at the control transformer 20 and the output terminals C and D across the second winding of the same, function as the same as the control converter-transformer 11 in the first embodiment in FIG. 3. Hence, the cycle period (or switching frequency) of each switching element 3 or 4 serving as the control means in the first embodiment is changed to enable the changing of initial voltage $V_{cp2}$ of resonance capacitor 7. Hence, the first control means changes the inductance between the input terminals A and B of control transformer 20 and the second control means changes the cycle period, or switching frequency, of the switching elements 3 and 4. The FIG. 19 embodiment is more advantageous than the FIG. 16 embodiment in that a small change in the inductance of the control transformer 20 is sufficient.

Figure 20:
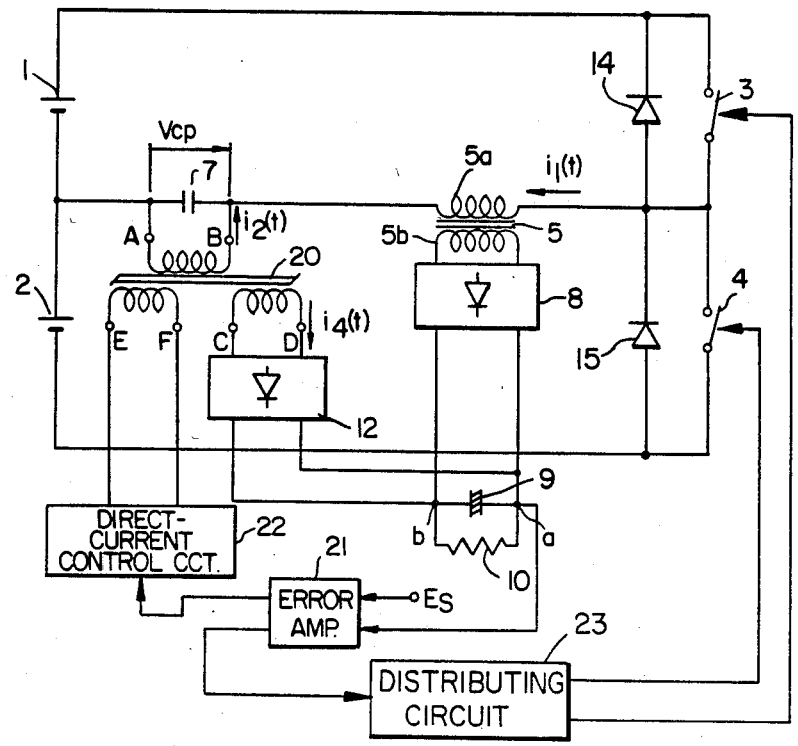
FIG. 20 is a circuit diagram of a eleventh embodiment of the invention.

Next, FIG. 20 is a circuit diagram of the eleventh embodiment of the invention, in which the components of function of the same as those in FIGS. 16 and 19 are designated by the same reference numerals. In FIG. 20, this eleventh embodiment is different from the tenth embodiment in that diodes 14 and 15 are connected in parallel to the switching elements 3 and 4 so as to be conductive in the reverse direction with respect to the conduction of each element 3 or 4, or in other words, being reverse biased with respect thereto. Also, the eleventh embodiment is basically the same in the operational principle as the tenth embodiment in FIG. 16 and the second embodiment in FIG. 5 and also the operating waveforms are the same as that in the eighth embodiment in FIG. 17, and accordingly, an explanation thereof has been omitted.

Figure 21:
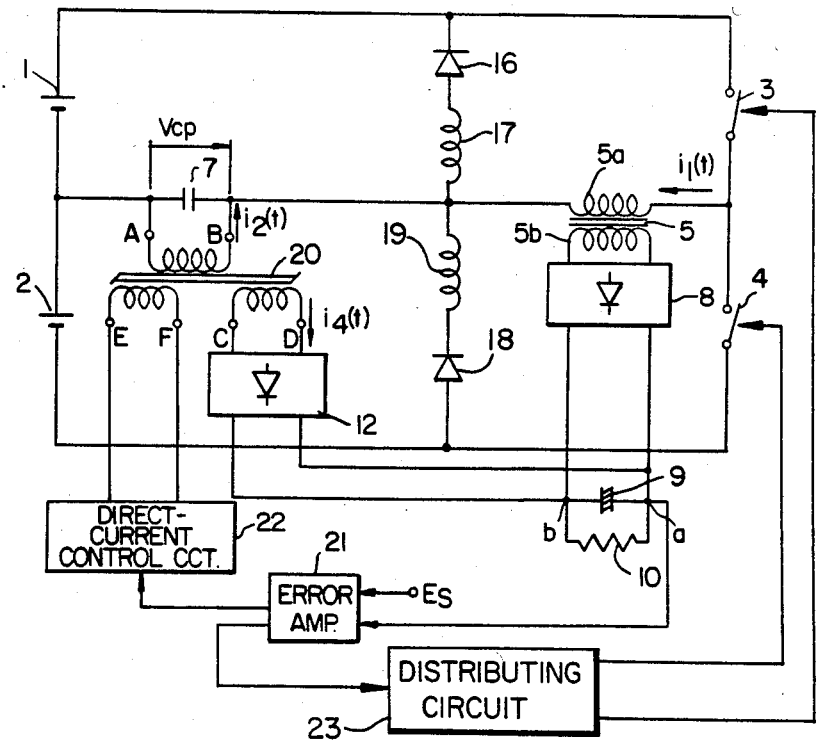
FIG. 21 is a circuit diagram of a twelfth embodiment of the invention.

The twelfth embodiment of the invention is shown in FIG. 21, in which the components of the same function as those in the ninth and tenth embodiments are designated by the same reference numerals. The twelfth embodiment further enlarges a control range for the input and output fluctuation in the tenth embodiment in FIG. 19.

This embodiment utilizes the feedback current from the resonance capacitor 7 in the same fashion as that of the eleventh embodiment shown in FIG. 20, but the feedback current is fed back to the DC power source 1 or 2 through the diode 16 or 18 and series connected coil 17 or 19, but not through the converter-transformer 5, thereby not serving as the output energy for the DC-DC converter. Furthermore, the inductance of coil 17 or 19 is changed to enable the cycle period of feedback current to desirably change, the control operation by the control means being quite the same as the tenth embodiment.

Figure 22:
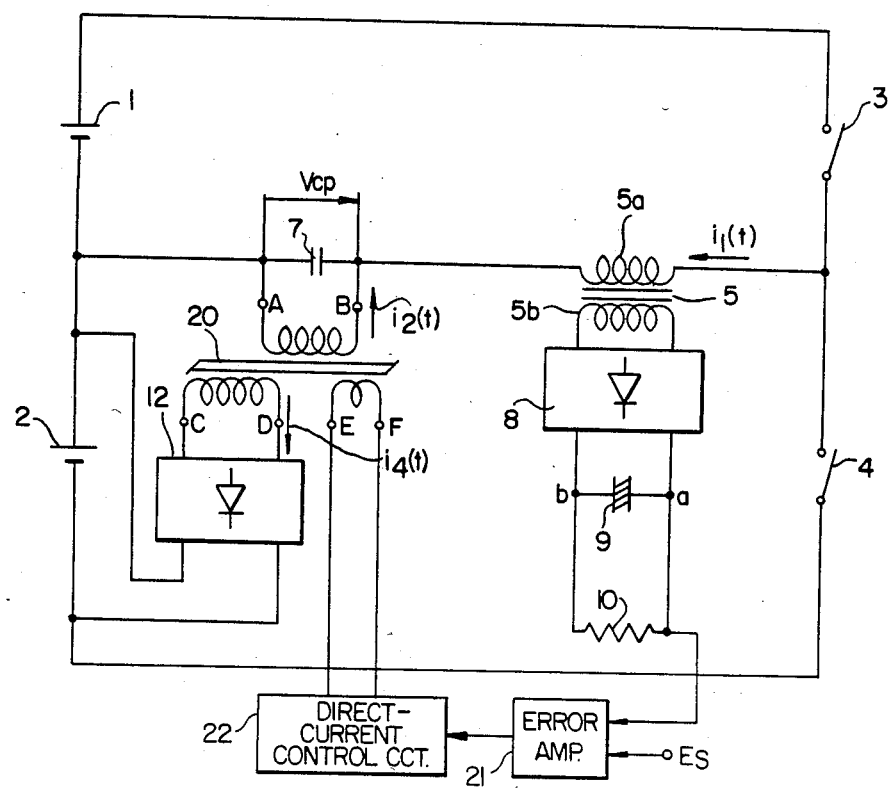
FIG. 22 is a circuit diagram of a thirteenth embodiment of the invention.

FIG. 22 is a circuit diagram of the thirteenth embodiment of the invention, in which the components having the same functions as those of the seventh embodiment in FIG. 14 are designated by the same reference numerals. The thirteenth embodiment is different from the seventh embodiment in that the output terminals C and D are connected to the DC power source 2 through a rectifier circuit 12, and is also different in that when voltage induced in the output terminals C and D at the control transformer 20 exceeds the voltage of DC power source 2, an output current $i_4(t)$ of control transformer 20 flows to the DC power source 2 through the rectifier circuit 12. In addition, the basic operation and waveforms of the thirteenth embodiment are the same as the seventh embodiment, and accordingly, an explanation thereof has been omitted.

Figure 23:
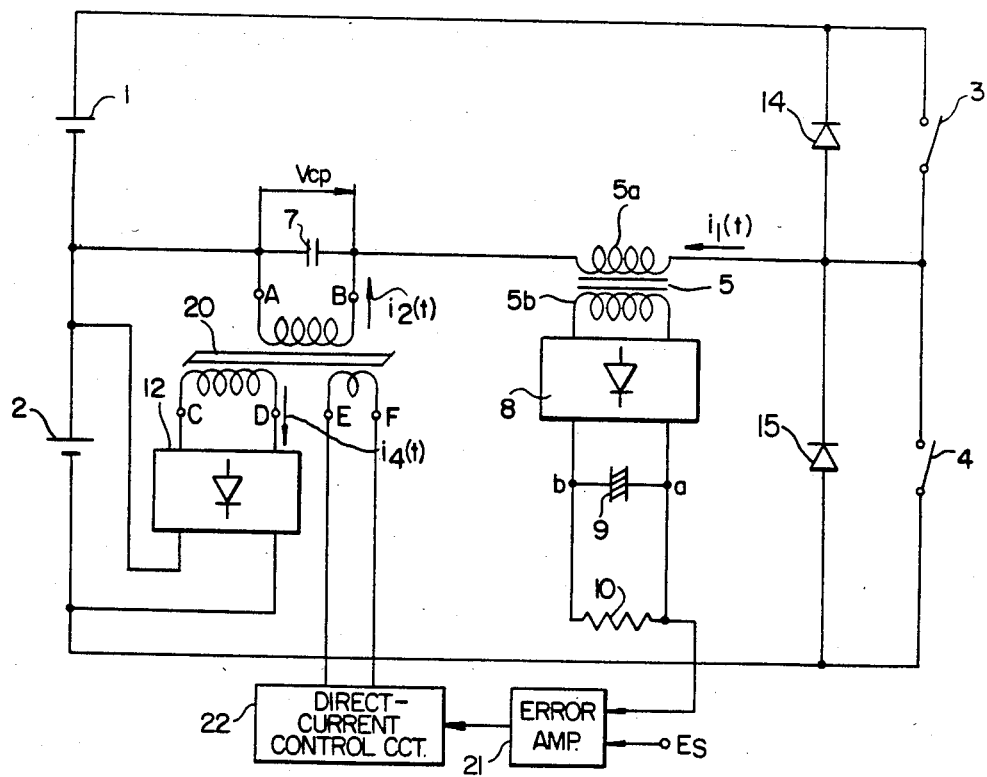
FIG. 23 is a circuit diagram of a fourteenth embodiment of the invention.

FIG. 23 is a circuit diagram of the fourteenth embodiment of the invention, in which the components of the same function as the eighth embodiment in FIG. 16 and the thirteenth embodiment on FIG. 22, are designated by the same reference numerals.

This embodiment utilizes to the FIG. 22 embodiment added with diodes 14 and 15 as used in the FIG. 16 embodiment the feedback current returning to the DC power source 1 or 2 from the resonance capacitor 7 through the converter-transformer 5 and diode 14 and 15. The operation of this fourteenth embodiment is the same as the eighth embodiment in FIG. 16 except that the output current $i_4(t)$ from the output terminals C and D of control transformers 20 flows to the DC power source 2.

Figure 24:
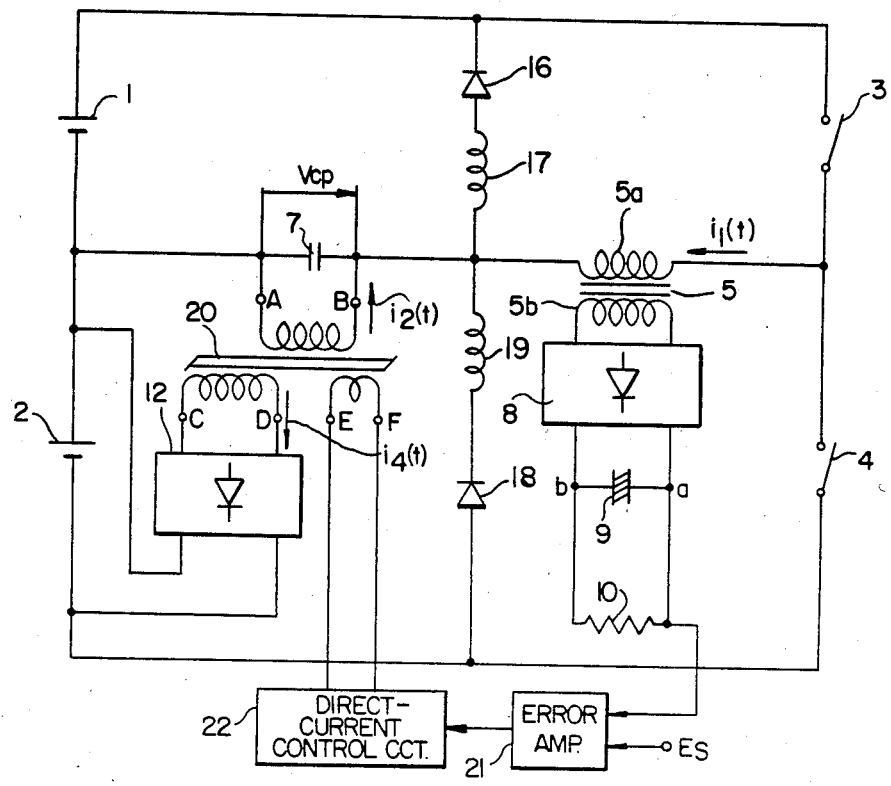
FIG. 24 is a circuit diagram of a fifteenth embodiment of the invention.

FIG. 24 is a circuit diagram of the fifteenth embodiment of the invention, in which the compartments functioning in the same fashion as those in the ninth and thirteenth embodiments in FIGS. 18 and 22 are also designated by the same reference numerals.

This fifteenth embodiment utilizes the feedback current from the resonance capacitor 7 in the same fashion as the fourteenth embodiment in FIG. 23 and functions in the same fashion as the ninth embodiment except that the output current from the output terminals C and D at the control transformer 20 flows to the DC power source 2 through the rectifier circuit 12.

Hereinafter, more detailed embodiments of the direct-current control circuit 22, the distribution circuit 23 and the control circuit 13 will be explained.

Figure 25:
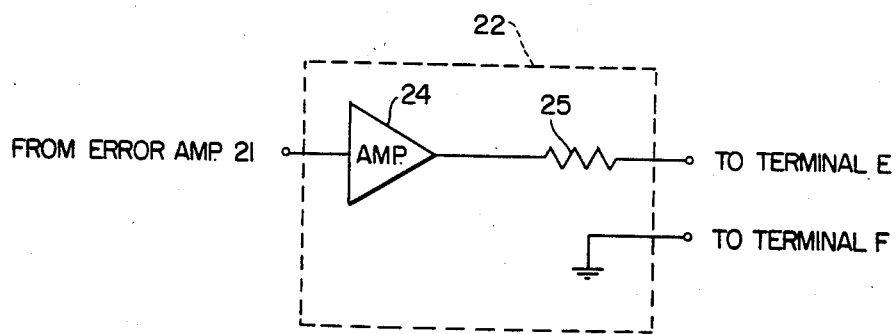
FIG. 25 is a circuit diagram of an embodiment of a direct-current control circuit.

FIG. 25 shows an circuit configuration example of the direct-current control circuit. In FIG. 25, element 24 designates an amplifier and element 25 designates a resistor. The output voltage of the error amplifier 21 is amplified by the amplifier 24; the output voltage of the amplifier 24 is converted to a current by the resistor 25, and this current flows from the terminal E to the terminal F of the control transformer 20. The value of the current is determined so that the inductance between the terminals A and B of the control transformer 20 becomes a predetermined value.

FIG. 26-(a) shows an embodiment of the distributing circuit 23, in which element 26 designates a voltage controlled oscillator, element 27 designates a monostable multivibrator, element 28 designates a 2-phase dividing circuit, and elements 29 and 30 designate driving circuits. FIG. 26-(b) shows waveforms at various point of the embodiment in FIG. 26-(a), in which a shows output pulses of the voltage-controlled oscillator 26, b shows output pulses of the monostable multivibrator 27, and c and d show output pulses of the 2-phase dividing circuit 28, applied to the driving circuits 29 and 30 respectively. The voltage-controlled oscillator 26 generates pulses (a) of a 50% duty cycle, the frequency thereof corresponding to the output voltage of the error amplifier 21. The monostable multivibrator 27 forms the pulses from the voltage-controlled oscillator 26 so that the pulse width becomes longer than the period of the resonant current (b). The 2-phase dividing circuit 28, which is constructed of a flip-flop, for example, divides the output pulses of the monostable multivibrator 27 into two pulse chains (c, d) which are respectively amplified by the driving circuit 29 and 30 so as to actuate the switch elements 3 and 4 to turn on or off.

The control circuit 13 is composed of the error amplifier 21 and the distribution circuit 23.

In the aforesaid construction, each DC power source 1 or 2, or assembled series connected sources 1 and 2 may be used to obtain the same effect.

Alternatively, a full bridge construction using four switching elements may be used to obtain the same effect. Also, a separate resonance coil may be interconnected in series between the resonance capacitor and the primary winding of converter-transformer to thereby utilize the inductance of resonance coil. Furthermore, the control transformer of variable inductance performance is not limited to that in FIG. 11, but may be available when having at least in first and second windings and changeable of the inductance of the first winding corresponding to the intensity of input electric signal.

Although several embodiments have been described, they are merely exemplary of the invention and not to be constructed as limiting, the invention being defined solely by the appended claims.

What is claimed is:

1. A constant voltage supply apparatus comprising:
   at least an input terminal for feeding an input direct current from an external direct current source;
   at least a switching element connected in series with same input terminal for switching said input direct current;
   a converter-transformer, a primary winding of said converter-transformer being connected in series with said switching element;
   a resonance capacitor connected in series with said primary winding of said converter-transformer;
   a common input terminal connected in series with said resonance capacitor;
   a first rectifier circuit coupled to a secondary winding of said converter-transformer for producing a rectified signal from a signal appearing across terminals of said secondary winding of said converter-transformer;
   a smooth circuit for smoothing said rectified signal so as to thereby obtain a dc output voltage;
   a dc output terminal for feeding said dc output voltage to an external load;
   a control transformer, a primary winding thereof being connected in parallel with said resonance capacitor, said control transformer further having a third winding for controlling an inductance of said control transformer by means of an electric signal fed thereto as a function of said dc output voltage; and a second rectifier circuit coupled to a secondary winding of said control transformer for rectifying a voltage signal produced across said secondary winding of said control transformer and for directly feeding a rectified voltage to said dc output terminal of said apparatus.

2. A constant voltage supply apparatus according to claim 20, further comprising a switching element control means for controlling a switching frequency of said switching element as a function of said dc output voltage of said apparatus.

* * * * *